United States Patent
Svensson et al.

(10) Patent No.: US 11,035,335 B2
(45) Date of Patent: Jun. 15, 2021

(54) LASER IGNITION SYSTEM

(71) Applicant: Caterpillar Inc., Peoria, IL (US)

(72) Inventors: Kenth I. Svensson, Peoria, IL (US); Ronald G Silver, Peoria, IL (US); Paul S K Wang, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/684,044

(22) Filed: Nov. 14, 2019

(65) Prior Publication Data
US 2021/0148325 A1   May 20, 2021

(51) Int. Cl.
| | |
|---|---|
| F02P 23/04 | (2006.01) |
| F02B 19/12 | (2006.01) |
| F02P 5/145 | (2006.01) |
| F02D 41/00 | (2006.01) |
| H01T 13/14 | (2006.01) |
| H01S 3/00 | (2006.01) |

(52) U.S. Cl.
CPC ............ *F02P 23/04* (2013.01); *F02B 19/12* (2013.01); *F02D 41/0097* (2013.01); *F02P 5/145* (2013.01); *H01T 13/14* (2013.01); *F02D 2200/023* (2013.01); *F23R 2900/00006* (2013.01); *H01S 3/00* (2013.01)

(58) Field of Classification Search
None
See application file for complete search history.

(56) References Cited

U.S. PATENT DOCUMENTS

| | | | | |
|---|---|---|---|---|
| 4,521,088 A | * | 6/1985 | Masom | F01D 21/003 |
| | | | | 359/507 |
| 4,837,770 A | * | 6/1989 | Koop | H01S 3/02 |
| | | | | 372/58 |
| 7,340,129 B2 | * | 3/2008 | Yalin | F02P 23/04 |
| | | | | 385/31 |
| 7,412,129 B2 | * | 8/2008 | Yalin | F02D 35/022 |
| | | | | 385/31 |
| 7,420,662 B2 | * | 9/2008 | Yalin | F02D 35/022 |
| | | | | 356/317 |
| 7,421,166 B1 | * | 9/2008 | Woodruff | F02P 23/04 |
| | | | | 123/143 R |
| 8,616,006 B2 | * | 12/2013 | Rocci Denis | F02C 7/266 |
| | | | | 60/776 |
| 8,807,107 B2 | * | 8/2014 | Weinrotter | F02P 23/04 |
| | | | | 123/143 B |

(Continued)

*Primary Examiner* — Kevin R Steckbauer
(74) *Attorney, Agent, or Firm* — Hibshman Claim Construction PLLC

(57) ABSTRACT

A device that includes a window, a catalyzed layer, and a laser source is disclosed. The window may include a first surface and a second surface. The catalyzed layer may be disposed on the first surface of the window. The catalyzed layer may include a compound having a threshold transmittance, and be configured to cause a reaction with soot in one or more of a combustion chamber or a pre-combustion chamber of a combustion engine at an activation temperature to reduce accumulation of soot on the window. The laser source may be disposed relative to the second surface of the window, and configured to emit a laser beam through the window and the catalyzed layer. The laser beam may be configured to cause ignition of an intake charge of one or more of the combustion chamber or the pre-combustion chamber.

17 Claims, 4 Drawing Sheets

(56) References Cited

U.S. PATENT DOCUMENTS

| | | | | |
|---|---|---|---|---|
| 8,833,323 B2* | 9/2014 | Weyl | ............... | F02C 7/264 |
| | | | | 123/143 B |
| 8,919,313 B2* | 12/2014 | Weinrotter | ............ | F02P 23/04 |
| | | | | 123/143 B |
| 9,027,523 B2* | 5/2015 | Morishima | ............ | F02P 23/04 |
| | | | | 123/143 B |
| 9,181,921 B2* | 11/2015 | Kanehara | ............ | F02P 23/04 |
| 9,284,939 B2* | 3/2016 | Woerner | ............ | F02B 23/105 |
| 9,316,200 B2* | 4/2016 | Woerner | ............ | F02P 23/04 |
| 9,377,003 B2* | 6/2016 | Woerner | ............ | F02P 23/04 |
| 9,574,541 B2* | 2/2017 | Ghosh | ............ | H01S 3/025 |
| 10,063,035 B2* | 8/2018 | Kanehara | ............ | F02P 23/04 |
| 10,559,942 B2* | 2/2020 | Hagita | ............ | H01S 5/423 |
| 2006/0032471 A1* | 2/2006 | Yalin | ............ | F02P 23/04 |
| | | | | 123/143 B |
| 2006/0037572 A1* | 2/2006 | Yalin | ............ | F02P 23/04 |
| | | | | 123/143 B |
| 2009/0035711 A1* | 2/2009 | Niwa | ............ | F02P 23/04 |
| | | | | 431/267 |
| 2010/0275867 A1* | 11/2010 | Weinrotter | ............ | F02P 23/04 |
| | | | | 123/143 B |
| 2012/0024250 A1* | 2/2012 | Weyl | ............ | F02C 7/264 |
| | | | | 123/143 B |
| 2012/0131927 A1* | 5/2012 | Denis | ............ | F02C 7/24 |
| | | | | 60/776 |
| 2012/0132167 A1* | 5/2012 | Weinrotter | ............ | F02P 23/04 |
| | | | | 123/143 B |
| 2013/0104827 A1* | 5/2013 | Woerner | ............ | F02P 23/04 |
| | | | | 123/143 B |
| 2013/0112164 A1* | 5/2013 | Morishima | ............ | F02P 23/04 |
| | | | | 123/143 B |
| 2013/0133602 A1* | 5/2013 | Woerner | ............ | F02P 23/04 |
| | | | | 123/143 B |
| 2013/0139774 A1* | 6/2013 | Woerner | ............ | F02P 23/04 |
| | | | | 123/143 B |
| 2013/0152893 A1* | 6/2013 | Woerner | ............ | F02P 23/04 |
| | | | | 123/143 B |
| 2013/0206091 A1* | 8/2013 | Kanehara | ............ | F02P 23/04 |
| | | | | 123/143 B |
| 2015/0005997 A1* | 1/2015 | Martin | ............ | F02P 23/04 |
| | | | | 701/22 |
| 2016/0348636 A1* | 12/2016 | Ghosh | ............ | H01S 3/025 |
| 2017/0250516 A1* | 8/2017 | Kiyosawa | ............ | H01S 5/423 |
| 2017/0373474 A1* | 12/2017 | Kanehara | ............ | F02P 23/04 |
| 2018/0226764 A1* | 8/2018 | Hagita | ............ | G02B 1/118 |
| 2018/0269656 A1* | 9/2018 | Hagita | ............ | H01S 5/18313 |
| 2018/0274481 A1 | 9/2018 | Silva | | |
| 2019/0226387 A1* | 7/2019 | Hayakawa | ............ | F02B 19/16 |
| 2021/0003108 A1* | 1/2021 | Ishikawa | ............ | H01S 3/094053 |

* cited by examiner

FIG. 3A

| Operating Time | Threshold Duration | Action |
|---|---|---|
| <Duration 1> | <Duration Threshold> | ... |
| <Duration 2> | <Duration Threshold> | ... |
| <Duration 3> | <Duration Threshold> | Perform Corrective Action |

| Operating Condition(s) | Combustion Quality Index | Threshold Index | Action |
|---|---|---|---|
| <Crankshaft Acceleration 1><br><In-cylinder Temperature 1><br><Exhaust Port Temperature 1> | <Index 1> | <Index Threshold> | ... |
| <Crankshaft Acceleration 2><br><In-cylinder Temperature 2><br><Exhaust Port Temperature 2><br>... | <Index 2> | <Index Threshold> | ... |
| <Crankshaft Acceleration 3><br><In-cylinder Temperature 3><br><Exhaust Port Temperature 3><br>... | <Index 3> | <Index Threshold> | Perform Corrective Action |

304

LASER IGNITION SYSTEM

TECHNICAL FIELD

The present disclosure relates generally to combustion engines and, for example, to a laser ignition system for a combustion engine.

BACKGROUND

An engine (e.g., a gasoline engine, a gaseous fuel-powered engine, a gas turbine engine, and/or another combustion engine) may combust an intake charge (e.g., air that may include diluents such as re-circulated exhaust gases, gaseous fuels such as natural gas, and/or the like) to generate power for use with a machine (e.g., a vehicle, a work machine, a generator, and/or the like). During an intake stroke of an engine cycle, the intake charge may be introduced into a combustion chamber of the engine (e.g., formed between a cylinder head, a cylinder bore, and a piston of the engine). During a compression stroke, the piston may move inward relative to the combustion chamber to compress the intake charge. During the compression stroke and/or a power stroke, the intake charge may be ignited by an ignition source to force the piston outward (e.g., to rotate a crankshaft). During an exhaust stroke, the piston may move inward to force exhaust gases out of the combustion chamber. A typical ignition system uses a spark plug to generate an electrical arc across electrodes to ignite the intake charge. The ignition system selectively applies a potential voltage across the electrodes to generate the electrical arc during the compression stroke and/or the power stroke.

Over time, a spark plug may become less effective or unable to cause ignition. For instance, unburned oil, fuel, carbon deposits, and/or soot can collect on the electrodes and adversely affect an ability to generate the electric arc. In some cases, the electrodes may erode, which may alter a gap between the electrodes and make it difficult to generate a sufficiently strong electric arc. Correspondingly, spark plugs are routinely serviced and/or replaced as maintenance items according to a predefined service interval. The service interval for spark plugs may be defined in terms of operating time, runtime, distance traveled for mobile machines, and/or the like, and may vary according to a type of the engine and/or an application of the engine. For instance, spark plugs of a natural gas engine may typically be replaced every 1,000 to 2,000 operating hours. In some cases, engine manufacturers may seek to operate an engine at higher power ratings (e.g., higher brake mean effective pressure (BMEP) levels), to generate more power per displacement volume. However, increasing BMEP levels may accelerate the erosion of the electrodes due to the high energy required to breakdown the gap because of the increased charge density. This erosion leads to shortened service intervals and possibly downtime.

In some cases, a laser may be used in place of a spark plug to cause ignition. For instance, a laser ignition system may include a laser source that is used to emit a laser through a window of the combustion chamber during the compression and/or the power stroke to ignite the intake charge. Since electrodes are not used, a laser ignition system may avoid many of the adverse effects associated with spark plugs and enable the engine to operate at higher BMEP levels. However, because the window of the laser ignition system is exposed to the combustion chamber, unburned oil, fuel, carbon deposits, and/or soot can accumulate on the window over time and at least partially obstruct the laser. A fouled window may result in a misfire, a decrease in power, a decrease in fuel economy, and/or an increase in unwanted emissions. Furthermore, without a means to detect whether the window is fouled, the window may need to be manually cleaned as a preventative measure according to a predetermined service interval. However, such a manual cleaning process may involve significant downtime (e.g., to disassemble the engine, clean the window, reassemble the engine, and/or the like) and a decrease in overall productivity.

One attempt to provide a laser ignition system is disclosed in U.S. Pat. No. 8,616,006, by Rocci Denis, et al., filed on Nov. 30, 2010 ("the '006 patent"). In particular, the '006 patent discloses a laser ignition system that is configured to generate and guide a laser beam to focus into a combustion chamber of an internal combustion engine to ignite combustive mediums. The '006 patent discloses a port that is formed in a combustor wall through which the laser beam passes, and that the port is configured to include a window having a coating applied thereto. The '006 patent discloses that the coating is a catalytic coating that aids in keeping the surface(s) of the window clean, and minimizes any negative effects on beam propagation through the window. However, the '006 patent does not sufficiently address the drawbacks of currently available ignition systems or the needs discussed above. For example, the '006 patent does not disclose a laser ignition system that can remove soot from the window at an activation temperature, detect a condition when soot collects on the window, or perform a corrective action that can actively remove an accumulation of soot from the window.

A laser ignition system of the present disclosure solves one or more of the problems set forth above and/or other problems in the art.

SUMMARY

According to some implementations, a device may include a window, a catalyzed layer, and a laser source. The window may have a first surface and a second surface. The catalyzed layer may be disposed on the first surface of the window, include a material having a threshold transmittance, and be configured to cause a reaction with soot in one or more of a combustion chamber or a pre-combustion chamber of a combustion engine at an activation temperature to reduce accumulation of the soot on the window. The laser source may be disposed relative to the second surface of the window, and configured to emit a laser beam through the window and the catalyzed layer. The laser beam may be configured to cause ignition of an intake charge of one or more of the combustion chamber or the pre-combustion chamber.

According to some implementations, a system may include a combustion engine, a window, a catalyzed layer, an optical source, and a controller. The combustion engine may have a combustion chamber configured to receive an intake charge. The combustion chamber may be defined between a cylinder head, a piston, and a cylinder bore of the combustion engine. The window may be disposed on one or more of the cylinder head or the cylinder bore of the combustion engine. The catalyzed layer may be disposed on the window and in fluid communication with the combustion chamber. The catalyzed layer may be configured to cause a reaction with soot in the combustion chamber at an activation temperature to reduce accumulation of the soot on the window. The optical source may be disposed relative to the window and configured to emit a beam of light into the combustion chamber through the window and the catalyzed layer. The controller may be in electrical communication with the combustion engine and the optical source, and configured to selectively enable the optical source to ignite the intake charge.

According to some implementations, a method may include transmitting, to an optical source, a command signal to emit a beam of light to ignite an intake charge of a combustion engine; determining an operating condition associated with the combustion engine; determining a combustion quality index of the combustion engine based on the operating condition, the combustion quality index being indicative of possible accumulation of soot on a window of the optical source; and causing an action to be performed based on the combustion quality index.

BRIEF DESCRIPTION OF THE DRAWINGS

FIGS. 3A and 3B are diagrams of an example implementation of a laser ignition system described herein.

DETAILED DESCRIPTION

Figure 1:
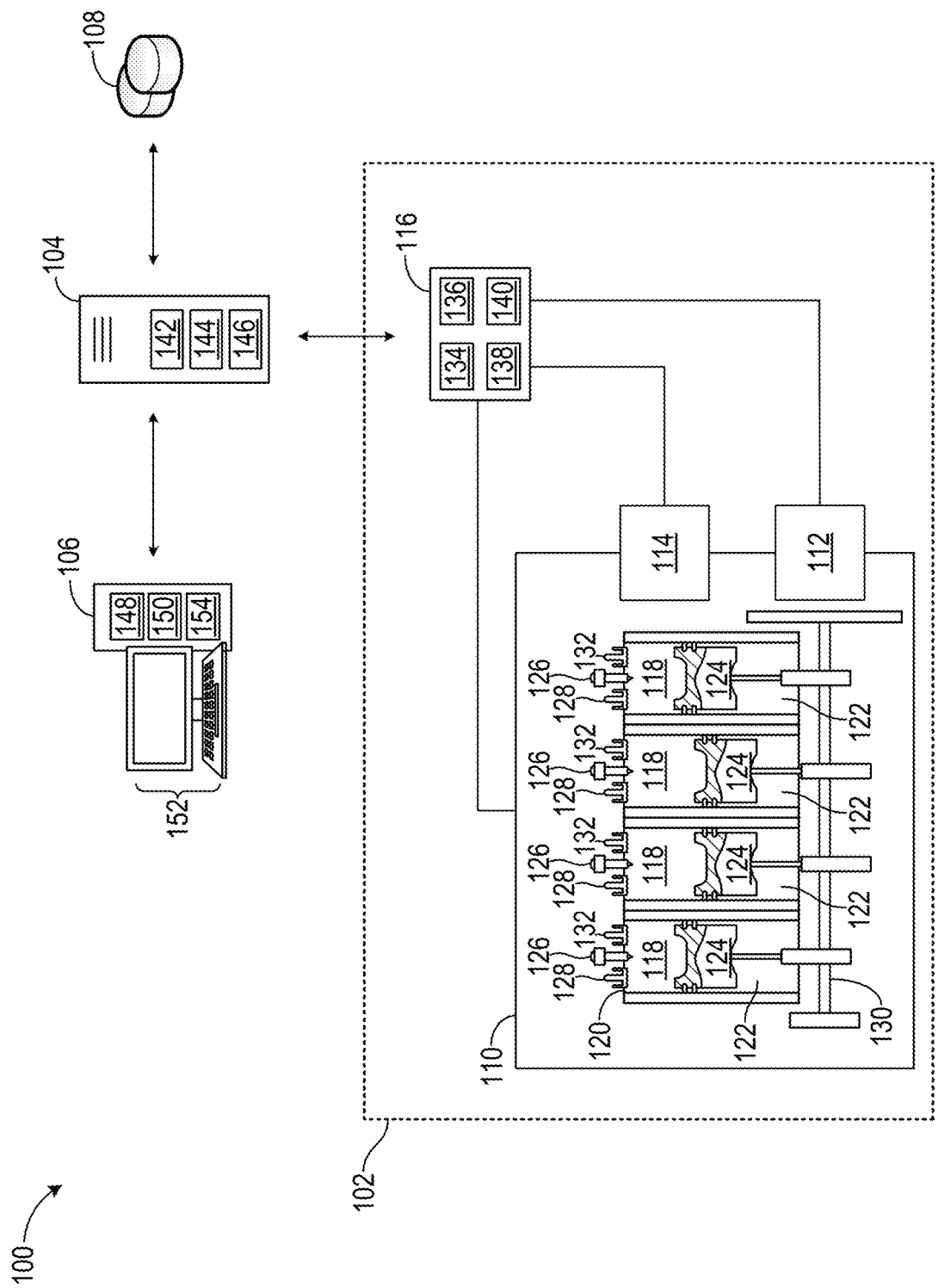
FIG. 1 is a diagram of an example control system described herein.

FIG. 1 is a diagram of an example control system 100 described herein. As shown in FIG. 1, control system 100 may be used in association with a machine 102 and include a management platform 104, a control station 106, a network storage device 108, and/or another device configured to support control system 100. Control system 100 may be used in conjunction with an ignition system of machine 102. Machine 102 may include a work machine (e.g., a truck, a dozer, a tractor, a wheel loader, a backhoe loader, an excavator, a cold planer, a paver, a compactor, and/or the like), a vehicle (e.g., an off-road vehicle, an on-road vehicle, a rail vehicle, a marine vehicle, and/or the like), a generator, a gas turbine machine and/or application, and/or another machine that generates power via combustion of an intake charge. Machine 102 may be operated by a local operator and/or by a remote operator via management platform 104 and/or control station 106. In some examples, machine 102 may be operated autonomously or semi-autonomously. Control station 106, network storage device 108, and/or another device of control system 100 may communicate with machine 102 directly and/or indirectly via management platform 104.

In some implementations, control system 100 may be used with multiple machines 102 and/or multiple control stations 106 that interact with management platform 104 and/or network storage device 108. In some examples, control system 100 may include multiple management platforms 104 and/or multiple network storage devices 108 that interact with machine 102 and/or control station 106. Control system 100 may be used with an autonomously or a semi-autonomously operated machine 102. For example, management platform 104 may be used to guide, navigate, and/or control an autonomous or a semi-autonomous machine 102 (e.g., a mobile work machine) based on location data of machine 102, coordinate data associated with a worksite of machine 102, coordinate data associated with a target work path and/or a target site plan, and/or the like. Machine 102 may receive guidance, navigation, and/or control information from an operator local to machine 102, from a remote operator via control station 106, and/or from another device of control system 100.

As further shown in FIG. 1, machine 102 includes an engine 110, a sensor 112, a laser ignition device 114, and a controller 116. Engine 110 includes one or more combustion chambers 118 configured to combust an intake charge to generate power for machine 102. For example, combustion chamber 118 may be formed between a cylinder head 120, a cylinder bore 122, and a piston 124 that is reciprocally movable within cylinder bore 122. During an intake stroke of engine 110, a fuel injector 126 may inject fuel into combustion chamber 118 and an intake port 128 may introduce air into combustion chamber 118 to form a mixture of fuel and air (e.g., an intake charge). During a compression stroke, a crankshaft 130 may rotate to cause piston 124 to move inward relative to combustion chamber 118 and compress the intake charge. During the compression and/or a power stroke, laser ignition device 114 may ignite the intake charge to force piston 124 in an outward direction relative to combustion chamber 118 and generate rotational torque via crankshaft 130. During an exhaust stroke, crankshaft 130 may rotate to cause piston 124 to move inwardly and force an exhaust gas out of combustion chamber 118 via an exhaust port 132.

Sensor 112 includes one or more devices configured to measure an operating condition of engine 110. For example, sensor 112 may include a crankshaft sensor, an in-cylinder sensor, an exhaust port sensor, and/or another sensing device that can be used by controller 116 to monitor combustion quality (e.g., in terms of efficiency, timing, output torque, output power, and/or the like). A crankshaft sensor may include a crankshaft position sensor (e.g., a magnetic sensor, an optical sensor, and/or an encoder) and/or another sensing device that enables controller 116 to determine an angular acceleration of crankshaft 130 as an indication of combustion quality. An in-cylinder sensor may include a temperature sensor (e.g., an in-cylinder thermocouple), a pressure sensor, and/or another sensing device that is disposed within combustion chamber 118 and enables controller 116 to determine combustion quality based on in-cylinder temperature, in-cylinder pressure, and/or the like. An exhaust port sensor may include a temperature sensor (e.g., an exhaust port thermocouple), a pressure sensor, and/or another sensing device that is disposed proximate to exhaust port 132 and enables controller 116 to determine combustion quality based on exhaust gas temperature, exhaust gas pressure, and/or the like. Sensor 112 may include a sensing device configured to provide another operating condition of engine 110 (e.g., an operating time, an engine speed, a throttle position, an oil temperature, an oil pressure, a coolant temperature, an injection timing, a load, a mass air flow rate, and/or the like).

Laser ignition device 114 includes one or more optical devices that are in optical communication with combustion chamber 118 and configured to ignite the intake charge. For example, laser ignition device 114 may include an optical source (e.g., a laser source) that is configured to emit a beam of light (e.g., a laser beam and/or another comparable form of optical radiation) with a focal point disposed within combustion chamber 118 and with sufficient intensity to ignite the intake charge. The optical source may be configured to selectively emit the beam of light according to an ignition schedule configured to coordinate timing of the laser beam with the position of piston 124. Laser ignition device 114 may emit the beam of light via a window that is disposed in fluid communication with combustion chamber 118. As described in more detail below, the window may include a catalyzed layer that is provided on a surface of the window and configured to reduce accumulation of soot on the window. Combustion chambers 118 may be provided with respective laser ignition devices 114 that are independently controlled by a single controller 116. Additionally, or alternatively, laser ignition device 114 may be arranged in a different configuration than described herein.

Controller 116 includes a processor 134, a memory 136, a user interface 138, and a communication device 140. Processor 134 is implemented in hardware, firmware, and/or a combination of hardware and software capable of being programmed to perform a function associated with machine 102, engine 110, and/or control system 100. Memory 136 includes a random-access memory (RAM), a read only memory (ROM), and/or another type of dynamic or static storage device that stores information and/or instructions to be performed by processor 134. User interface 138 includes an input device and an output device. The input device may enable an operator of machine 102 to specify an instruction, a command, and/or another operating parameter for operating machine 102, engine 110, and/or laser ignition device 114. The output device may enable an operator of machine 102 to monitor an operating condition of machine 102 and/or engine 110 (e.g., via sensor data provided by one or more sensors 112), determine combustion quality of engine 110 (e.g., via a combustion quality index determined by controller 116), access a record associated with a service interval of machine 102, engine 110, and/or laser ignition device 114, access a notification relating to a service interval of machine 102, engine 110, and/or laser ignition device 114, and/or the like.

Communication device 140 includes a local area network (LAN) component (e.g., an Ethernet component), a wireless local area network (WLAN) component (e.g., a Wi-Fi component), a radio frequency (RF) communication component (e.g., a Bluetooth component and/or a cellular component), a positioning component (e.g., a global positioning system (GPS) component and/or a global navigation satellite system (GNSS) component), and/or the like. Communication device 140 may enable communication between machine 102, management platform 104, control station 106, network storage device 108, and/or another device. Communication device 140 may enable processor 134 to receive information (e.g., relating to an operating parameter for operating machine 102, engine 110, and/or laser ignition device 114) from management platform 104, control station 106, and/or network storage device 108. Communication device 140 may enable processor 134 to transmit information (e.g., relating to an operating condition of machine 102, engine 110, and/or laser ignition device 114, a combustion quality index determined by controller 116, a record or a notification relating to a service interval of machine 102, engine 110, and/or laser ignition device 114, and/or the like) to management platform 104, control station 106, and/or network storage device 108. Controller 116 may communicate with control station 106 and/or network storage device 108 directly and/or indirectly via management platform 104.

In some implementations, controller 116 may be integrated with or include an engine control module (ECM), an engine control unit (ECU), and/or another controller that is associated with machine 102 and/or engine 110. For example, controller 116 may be configured to control laser ignition device 114 in addition to engine 110 and/or another component of machine 102. In some examples, controller 116 may include a dedicated controller of laser ignition device 114 that is provided separately from and in addition to an ECM, an ECU, and/or another controller associated with machine 102 and/or engine 110. Controller 116 and/or laser ignition device 114 may be configured to be removably installed on machine 102 and/or engine 110, or permanently integrated with machine 102 and/or engine 110. In some examples, one or more components of laser ignition device 114 (e.g., an optical source, a window, a catalyzed layer, and/or the like) may be configured to be removably installed on machine 102 and/or engine 110, or permanently integrated with machine 102 and/or engine 110. One or more functions described herein as being performed by controller 116 may be performed by management platform 104, control station 106, and/or network storage device 108.

As further shown in FIG. 1, management platform 104 includes a processor 142, a memory 144, and a communication device 146. Processor 142 is implemented in hardware, firmware, and/or a combination of hardware and software capable of being programmed to perform a function associated with machine 102, engine 110, and/or control system 100. Memory 144 includes a RAM, a ROM, and/or another type of dynamic or static storage device that stores information and/or instructions to be performed by processor 142. Communication device 146 includes a LAN component (e.g., an Ethernet component), a WLAN component (e.g., a Wi-Fi component), an RF communication component (e.g., a Bluetooth component), a positioning component (e.g., a GPS component and/or a GNSS component), and/or the like. For example, communication device 146 may enable processor 142 to exchange information (e.g., relating to an operating parameter for operating machine 102, engine 110, and/or laser ignition device 114, an operating condition of machine 102, engine 110, and/or laser ignition device 114, a combustion quality index determined by controller 116, a record or a notification relating to a service interval of machine 102, engine 110, and/or laser ignition device 114, and/or the like) with machine 102, control station 106, and/or network storage device 108.

As further shown in FIG. 1, control station 106 includes a processor 148, a memory 150, a user interface 152, and a communication device 154. Processor 148 is implemented in hardware, firmware, and/or a combination of hardware and software capable of being programmed to perform a function associated with machine 102, engine 110, and/or control system 100. Memory 150 includes a RAM, a ROM, and/or another type of dynamic or static storage device that stores information and/or instructions to be performed by processor 148. User interface 152 includes an input device and an output device. The input device may enable an operator of machine 102 (e.g., an operator that is remote from machine 102) to specify an instruction, a command, and/or another operating parameter for operating machine 102, engine 110, and/or laser ignition device 114. The output device may enable an operator of machine 102 to monitor an operating condition of machine 102 and/or engine 110 (e.g., via sensor data provided by one or more sensors 112), determine combustion quality of engine 110 (e.g., via a combustion quality index determined by controller 116), access a record associated with a service interval of machine 102, engine 110, and/or laser ignition device 114, access a notification relating to a service interval of machine 102, engine 110, and/or laser ignition device 114, and/or the like.

Communication device 154 includes a LAN component (e.g., an Ethernet component), a WLAN component (e.g., a Wi-Fi component), an RF communication component (e.g., a Bluetooth component), a positioning component (e.g., a GPS component and/or a GNSS component), and/or the like. Communication device 154 may enable processor 148 to receive information (e.g., relating to an operating condition of machine 102, engine 110, and/or laser ignition device 114, a combustion quality index determined by controller 116, a record or a notification relating to a service interval of machine 102, engine 110, and/or laser ignition device 114, and/or the like) from machine 102, management platform 104, and/or network storage device 108. Communication device 154 may enable processor 142 to transmit information (e.g., relating to an operating parameter for operating machine 102, engine 110, and/or laser ignition device 114) to machine 102, and/or transmit information (e.g., relating to an operating condition of machine 102, engine 110, and/or laser ignition device 114, a combustion quality index determined by controller 116, a record or a notification relating to a service interval of machine 102, engine 110, and/or laser ignition device 114, and/or the like) to management platform 104 and/or network storage device 108. Control station 106 may communicate with machine 102 and/or network storage device 108 directly and/or indirectly via management platform 104. In some examples, control station 106 may serve as a user interface of management platform 104.

As indicated above, FIG. 1 is provided as an example. Other examples may differ from what is described in connection with FIG. 1.

Figure 2A:
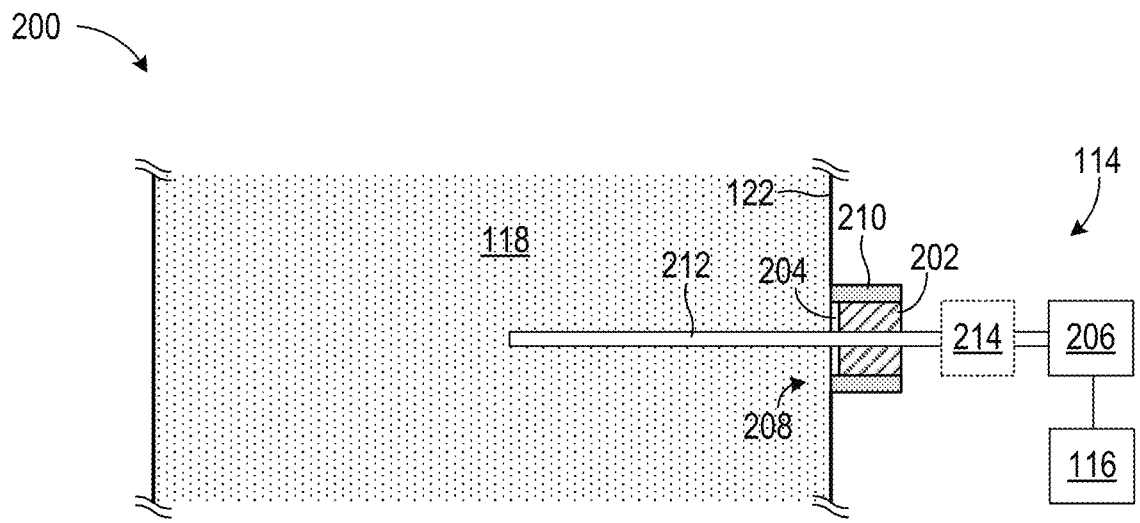
FIGS. 2A and 2B are diagrams of an example implementation of a laser ignition system described herein.
Figure 2B:
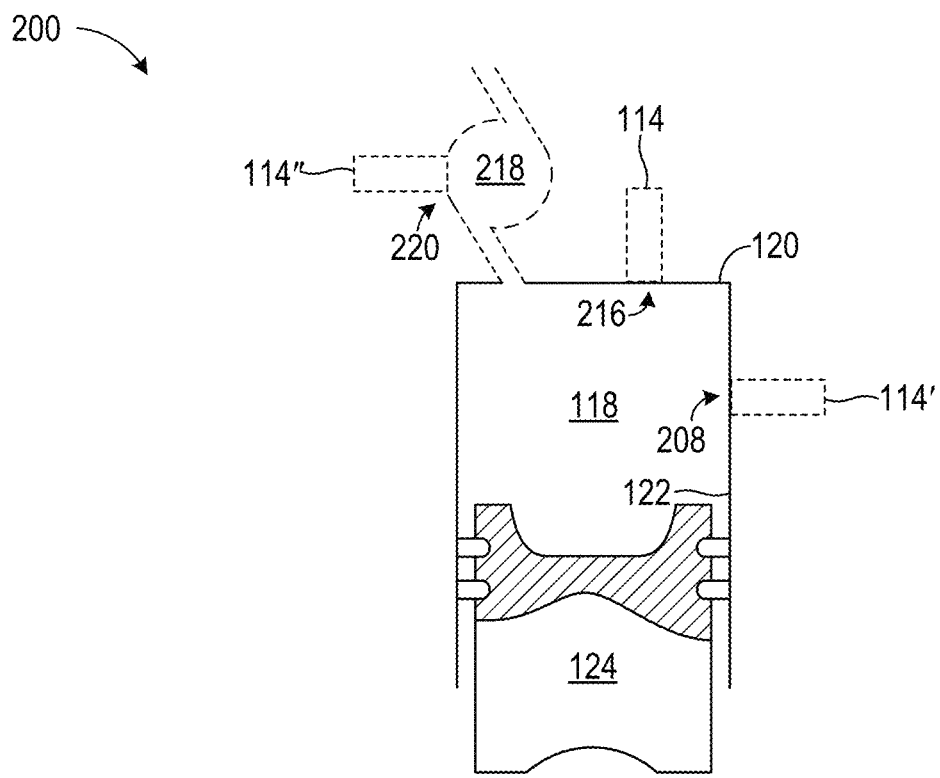

FIGS. 2A and 2B are diagrams of an example laser ignition system 200 described herein. As shown by the cross-sectional side view in FIG. 2A, laser ignition system 200 includes laser ignition device 114. Laser ignition device 114 includes a window 202, a catalyzed layer 204, and an optical source 206. In some examples, laser ignition device 114 may include controller 116 (e.g., provided as a dedicated controller of laser ignition device 114) that is in communication with optical source 206. Additionally, or alternatively, controller 116 of laser ignition device 114 may be integrated with an ECM, an ECU, and/or another controller of engine 110 and/or machine 102. As shown for the example in FIG. 2A, laser ignition device 114 may be disposed in fluid communication with combustion chamber 118 (e.g., installed within a surface of cylinder bore 122) in a manner configured to selectively ignite an intake charge within combustion chamber 118 (e.g., during a compression stroke and/or a power stroke of an engine cycle). Laser ignition system 200 may include a plurality of laser ignition devices 114 that are installed relative to a corresponding plurality of combustion chambers 118 available in engine 110.

Window 202 includes a transparent material configured to allow transmission of light (e.g., a laser beam and/or another comparable form of optical radiation) with minimal loss in intensity. Window 202 may be formed of a material that enables sufficient transmittance (e.g., a transmittance of at least 90%) of a light emitted by optical source 206. For example, window 202 may include silicon dioxide (e.g., silica), quartz, sapphire, and/or another suitable material. As shown for the example in FIG. 2A, window 202 may be disposed within an aperture 208 that is located on a surface of cylinder bore 122 and optically aligned between optical source 206 and combustion chamber 118. Window 202 may include an outer surface that is proximate to optical source 206 and an inner surface that is proximate to combustion chamber 118. The inner surface of window 202 may be configured to be substantially flush with or at least partially recessed relative to the surface of cylinder bore 122. Window 202 may be secured within aperture 208 via one or more seals 210. In some examples, seals 210 may include insulating material configured to reduce heat transfer between window 202 and cylinder bore 122. For example, seals 210 may be configured to reduce heat dissipation (e.g., caused by a cooling mechanism of engine 110), and enable window 202 to quickly achieve and/or maintain an activation temperature of catalyzed layer 204 of window 202. In some examples, laser ignition device 114 may include a different number and/or a different arrangement of windows 202 and/or seals 210.

Catalyzed layer 204 includes a transparent compound configured to cause a reaction with soot in combustion chamber 118 and reduce obstruction of window 202. For example, catalyzed layer 204 may include a compound formed of a rare metal (e.g., cerium oxide and/or the like) and/or a catalyst that is configured to cause a reaction with soot (e.g., cause oxygen, nitrogen dioxide, and/or any other compound to react with soot and convert soot to carbon dioxide) at an activation temperature (e.g., a temperature of at least 400° C. and/or another temperature typical of combustion chamber 118 during a compression and/or a power stroke of an engine cycle) to oxidize soot that may have collected on catalyzed layer 204. In some examples, catalyzed layer 204 may be formed of a different metal and/or catalyst, and configured to cause a reaction with soot at a different activation temperature. Catalyzed layer 204 may be disposed on an inner surface of window 202 and in fluid communication with an intake charge within combustion chamber 118. In some examples, catalyzed layer 204 may be configured to be flush with or at least partially recessed relative to the surface of cylinder bore 122. As described above, catalyzed layer 204 may be insulated from cylinder bore 122 via seals 210 that are configured to reduce dissipation of heat from catalyzed layer 204 to cylinder bore 122 and maintain catalyzed layer 204 at the activation temperature for longer durations.

In some implementations, catalyzed layer 204 may have a thickness suited to sufficiently cause a reaction with soot in combustion chamber 118 without adversely affecting transmittance of light. For example, catalyzed layer 204 may be formed with a compound and/or a dimension that enable sufficient transmittance (e.g., a transmittance of at least 90%) of a light emitted by optical source 206. If catalyzed layer 204 is formed of a compound using cerium oxide, catalyzed layer 204 may have a thickness ranging between approximately 1 nm and 2.5 nm to achieve a desired transmittance and/or reactive effect. If catalyzed layer 204 is formed of a compound with greater transmittance properties, catalyzed layer 204 may have a thickness ranging between approximately 1 nm and 10 nm. Catalyzed layer 204 may be coated onto the inner surface of window 202. Additionally, or alternatively, catalyzed layer 204 may be provided as a film that can be removably coupled to the inner surface of window 202. In some examples, catalyzed layer 204 may be configured to be replaceable relative to window 202 as a maintenance item. In some examples, window 202 and catalyzed layer 204 may be replaceable relative to cylinder bore 122 as a maintenance item.

Optical source 206 includes a device configured to emit a beam of light 212 (e.g., a laser beam) into combustion chamber 118 and directed at an intake charge. Optical source 206 may emit beam of light 212 (e.g., optical radiation having a wavelength and an intensity suited to sufficiently transmit through window 202 and catalyzed layer 204, and ignite the intake charge). For example, optical source 206 may include a laser source that is configured to emit beam of light 212 as a laser beam with a wavelength ranging approximately between 400 nm and 1200 nm. Optical source 206 may be disposed relative to an outer surface of window 202 and configured to align beam of light 212 with window 202, catalyzed layer 204, and combustion chamber 118. Optical source 206 may be configured and/or positioned to emit beam of light 212 at a focal point within combustion chamber 118 suited to provide optimal ignition during the compression and/or the power stroke. In some examples, optical source 206 may be provided with a lens pack 214 (e.g., one or more lenses) configured to focus, expand, and/or otherwise adjust the focal point of beam of light 212. Lens pack 214 may be coupled to the outer surface of window 202 and/or coupled to optical source 206. In some examples, window 202 and/or catalyzed layer 204 may be provided with a convex surface and/or a concave surface configured to focus, expand, or otherwise adjust the focal point of beam of light 212. Optical source 206 may be integrated with engine 110 or removably positioned relative to engine 110.

In some implementations, laser ignition device 114 may use controller 116 to control optical source 206. For example, controller 116 may transmit a command signal to optical source 206 to emit beam of light 212 and ignite an intake charge within combustion chamber 118 during a compression stroke and/or a power stroke of engine 110. Controller 116 may transmit the command signal according to an ignition schedule (e.g., a table, a map, an index, and/or the like) that enables controller 116 to coordinate timing of beam of light 212 with the compression and/or the power stroke. For example, the ignition schedule may provide information that suggests appropriate ignition timing (e.g., based on a position of piston 124 relative to combustion chamber 118 of engine 110) for different operating conditions of engine 110. In some examples, the ignition schedule may be preprogrammed in memory 136 of controller 116. Additionally, or alternatively, the ignition schedule may be stored in memory 144 of management platform 104, memory 150 of control station 106, network storage device 108, and/or another data structure that is accessible to controller 116. In some examples, optical source 206 may be at least partially controlled via processors 142 of management platform 104, processor 148 of control station 106, and/or another device of control system 100.

In some implementations, controller 116 may be configured to determine an operating condition associated with engine 110. For example, controller 116 may receive sensor data from sensors 112, and use the sensor data to determine an operating time of engine 110, an angular acceleration of crankshaft 130, an in-cylinder temperature, an in-cylinder pressure, and/or an exhaust gas temperature. Additionally, or alternatively, controller 116 may be configured to determine an engine speed, a throttle position, an oil temperature, an oil pressure, a coolant temperature, an injection timing, a load, a mass air flow rate, and/or another operating condition that is available via sensors 112 and/or otherwise accessible to controller 116. In some examples, controller 116 may be configured to determine a combustion quality index of engine 110. For example, based on one or more operating conditions of engine 110, controller 116 may be able to identify when combustion is suboptimal, and quantify a quality of the combustion in terms of the combustion quality index. The combustion quality index may be indicative of an effectiveness of optical source 206 to ignite an intake charge within combustion chamber 118 and/or indicative of possible accumulation of soot on window 202 of optical source 206, as described in more detail below.

In some implementations, controller 116 may be configured to cause an action to be performed based on the combustion quality index. For example, controller 116 may compare the combustion quality index with a threshold index, and cause an action to be performed based on determining that the combustion quality index does not satisfy the threshold index. In such cases, the threshold index may correspond to an upper limit that, if satisfied and/or exceeded by the combustion quality index, suggests that the combustion quality is optimal and that window 202 of laser ignition device 114 is unobstructed by soot. The threshold index may be fixed or dynamically adjusted based on an operating condition of engine 110. Additionally, or alternatively, controller 116 may compare the combustion quality index with a threshold index that corresponds to a lower limit and is satisfied if the combustion quality index falls to or below the threshold index. In such cases, controller 116 may cause an action to be performed based on determining that the combustion quality index satisfies the threshold index. In some examples, controller 116 compares the combustion quality index with a plurality of threshold indices to determine whether window 202 is potentially obstructed by soot and whether an action should be performed.

In some implementations, controller 116 may be configured to cause a corrective action to be performed based on determining that the combustion quality index does not satisfy the threshold index. For example, the corrective action may be configured to increase a temperature of combustion chamber 118 of engine 110 to an activation temperature of catalyzed layer 204 (e.g., a temperature of at least 400° C. and/or another temperature sufficient to cause catalyzed layer 204 to cause a reaction with soot) for a threshold duration of time (e.g., a duration sufficient to cause catalyzed layer 204 to oxidize and remove soot from a path of beam of light 212). In some examples, controller 116 may transmit an engine control signal to engine 110 that temporarily increases an operating temperature of engine 110 (e.g., via adjusting an injection timing and/or a load, via adjusting a mass flow rate of a variable geometry turbocharger, and/or the like) in order to increase the temperature of combustion chamber 118 to the activation temperature. Controller 116 may maintain the corrective action for the threshold duration of time and/or until the combustion quality index satisfies the threshold index. Controller 116 may repeat and/or maintain the corrective action if the combustion quality index does not satisfy the threshold index upon expiration of the threshold duration of time.

In some implementations, controller 116 may be configured to generate a record and/or a notification of the combustion quality index, transmit the record and/or the notification to management platform 104, control station 106, and/or network storage device 108, and/or store the record and/or the notification in a data structure accessible to an operator of machine 102 (e.g., via memory 136 of controller 116, memory 144 of management platform 104, memory 150 of control station 106, and/or network storage device 108). The record and/or the notification may include information relating to the combustion quality index, the threshold index used to assess the combustion quality index, a time corresponding to the combustion quality index, and/or an operating condition of engine 110 at a time the combustion quality index was determined. For example, the record and/or the notification may include an operating time of engine 110, an angular acceleration of crankshaft 130, an in-cylinder temperature, an in-cylinder pressure, an exhaust gas temperature, an engine speed, a throttle position, an oil temperature, an oil pressure, a coolant temperature, an injection timing, a load, a mass air flow rate, and/or another operating condition that is available via sensors 112 and/or otherwise accessible to controller 116.

As shown in FIG. 2B, laser ignition device 114 of laser ignition system 200 may be provided in one of various arrangements. For example, and as described above with respect to the example of FIG. 2A, laser ignition device 114 may be installed within an aperture 208 of cylinder bore 122 and configured to ignite an intake charge within combustion chamber 118. In some examples, laser ignition device 114' may be installed within an aperture 216 of cylinder head 120 and configured to ignite an intake charge within combustion chamber 118. In some examples, such as when engine 110 includes a pre-combustion chamber 218 that is in fluid communication with combustion chamber 118, laser ignition device 114" may be installed within an aperture 220 of cylinder head 120 and configured to ignite an intake charge within pre-combustion chamber 218. Similar to the example in FIG. 2A, window 202 and catalyzed layer 204 of laser ignition device 114' and/or laser ignition device 114" may be configured to be flush with or at least partially recessed relative to a corresponding surface of cylinder head 120, and provided with seals 210 to reduce heat transfer between window 202, catalyzed layer 204, and cylinder head 120. In some examples, laser ignition device 114 may be provided in a different arrangement than shown.

As indicated above, FIGS. 2A and 2B are provided as an example. Other examples may differ from what is described in connection with FIGS. 2A and 2B.

FIGS. 3A and 3B are diagrams of an example implementation 300 of laser ignition system 200 described herein. As shown in FIG. 3A, and by reference number 302, controller 116 may initiate a corrective action based on an operating time of engine 110 (e.g., as preventative maintenance and/or in case normal operating conditions do not allow catalyzed layer 204 to sufficiently oxidize soot). For example, controller 116 may determine an operating time of engine 110 (e.g., Duration N), compare the operating time to a threshold duration (e.g., Duration Threshold), and initiate a corrective action based on determining that the operating time satisfies the threshold duration. In some examples, the operating time and/or the threshold duration may be defined in terms of operating hours or engine runtime since manufacture, since a prior maintenance service, since engine start, and/or another reference. In some examples, such as when machine 102 is a mobile machine, the operating time and/or the threshold duration may be defined in terms of distance traveled since manufacture, since a prior maintenance service, since engine start, and/or another reference. As described above, the corrective action may cause a temperature of combustion chamber 118 to increase to the activation temperature of catalyzed layer 204 for a threshold duration of time.

As shown in FIG. 3B, and by reference number 304, controller 116 may initiate a corrective action based on an operating condition of engine 110 (e.g., based on a combustion quality index that suggests potential obstruction of beam of light 212). For example, controller 116 may receive sensor data (e.g., via sensors 112) relating to the combustion quality of one or more combustion chambers 118, identify a decrease in the combustion quality based on the sensor data, and initiate a corrective action based on the decrease in the combustion quality. As shown, controller 116 may determine an angular acceleration of crankshaft 130 (e.g., Crankshaft Acceleration N), an in-cylinder temperature (e.g., In-cylinder Temperature N), an exhaust port temperature (e.g., Exhaust Port Temperature N), and/or another operating condition of engine 110 based on the sensor data, and determine a combustion quality index (e.g., Index N) based on one or more of the operating conditions. For example, a decrease in the angular acceleration of crankshaft 130, a decrease in the in-cylinder temperature, and/or a decrease in the exhaust port temperature during the power stroke and/or the exhaust stroke of engine 110 may be indicative of a decrease in the combustion quality and exhibit a corresponding decrease in the combustion quality index.

In some implementations, controller 116 may be configured to compare the combustion quality index with a threshold index (e.g., Index Threshold). As shown for the example in FIG. 3B, the threshold index may be a fixed value irrespective of the operating condition of engine 110. In some examples, the threshold index may be variable based on changes in the operating condition of engine 110. If the combustion quality index satisfies the threshold index, controller 116 may deem that window 202 is not obstructed by soot and determine that a corrective action is not necessary. If the combustion quality index does not satisfy the threshold index, controller 116 may initiate a corrective action. As described above, the corrective action may cause a temperature of combustion chamber 118 to increase to the activation temperature of catalyzed layer 204 for a threshold duration of time. In some examples, controller 116 may be configured to initiate a corrective action if the combustion quality index satisfies the threshold index, and take no action if the combustion quality index does not satisfy the threshold index. Additionally, or alternatively, controller 116 may compare individual operating conditions with respective thresholds (e.g., a crankshaft acceleration threshold, an in-cylinder temperature threshold, an exhaust port temperature threshold, and/or the like) to determine whether a corrective action and/or another action should be performed.

As indicated above, FIGS. 3A and 3B are provided as an example. Other examples may differ from what is described in connection with FIGS. 3A and 3B.

Figure 4:
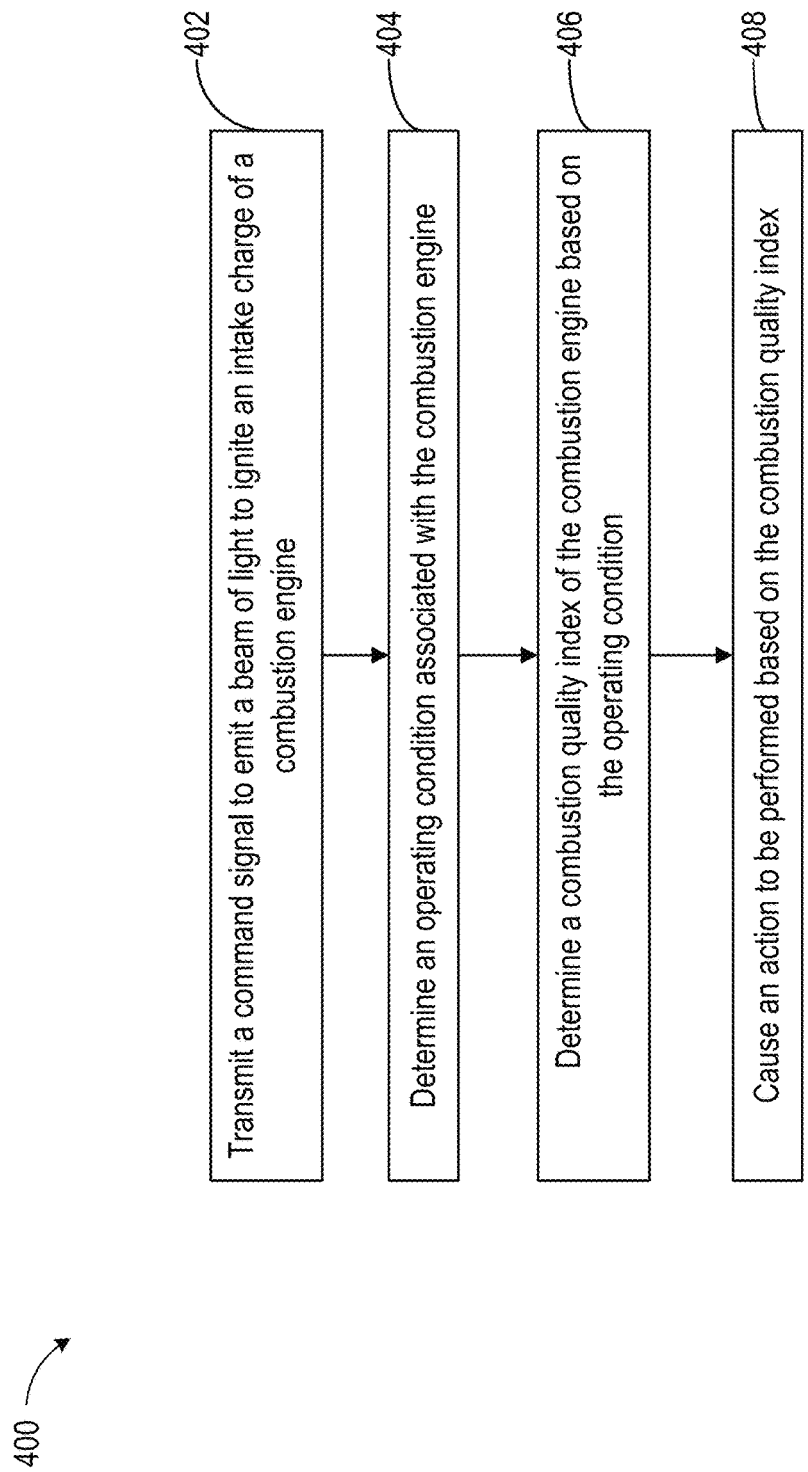
FIG. 4 is a flow chart of an example process for operating a laser ignition system.

FIG. 4 is a flow chart of an example process 400 for operating a laser ignition system. One or more process blocks of FIG. 4 may be performed by a controller (e.g., controller 116 of machine 102) and/or by another component or a group of components separate from or including the controller (e.g., management platform 104, control station 106, network storage device 108, and/or the like).

As shown in FIG. 4, process 400 may include transmitting a command signal to emit a beam of light to ignite an intake charge of a combustion engine (block 402). For example, the controller (e.g., using processor 134, memory 136, user interface 138, communication device 140, and/or the like) may transmit a command signal to emit a beam of light to ignite an intake charge of a combustion engine, as described above.

As further shown in FIG. 4, process 400 may include determining an operating condition associated with the combustion engine (block 404). For example, the controller (e.g., using processor 134, memory 136, user interface 138, communication device 140, and/or the like) may determine an operating condition associated with the combustion engine, as described above.

As further shown in FIG. 4, process 400 may include determining a combustion quality index of the combustion engine based on the operating condition, the combustion quality index being indicative of possible accumulation of soot on a window of the optical source (block 406). For example, the controller (e.g., using processor 134, memory 136, user interface 138, communication device 140, and/or the like) may determine a combustion quality index of the combustion engine based on the operating condition, as described above. The combustion quality index may be indicative of possible accumulation of soot on a window of the optical source.

As further shown in FIG. 4, process 400 may include causing an action to be performed based on the combustion quality index (block 408). For example, the controller (e.g., using processor 134, memory 136, user interface 138, communication device 140, and/or the like) may cause an action to be performed based on the combustion quality index, as described above.

Process 400 may include variations and/or additional implementations to those described in connection with FIG. 4, such as any single implementation or any combination of implementations described elsewhere herein. Although FIG. 4 shows example blocks of process 400, in some examples, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

An ignition system may be used for a combustion engine (e.g., a gasoline engine, a gaseous fuel-powered engine, a gas turbine engine, and/or another combustion engine). In general, an ignition system may include an ignition source (e.g., a spark plug or a laser source) that is used to ignite an intake charge within a combustion chamber of the engine during a compression stroke and/or a power stroke of the engine cycle. Over time, the ignition source may foul and become unable to cause effective and/or timely combustion. For example, unburned oil, fuel, carbon deposits, and/or soot may collect on electrodes of a spark plug or a window of a laser source, and hinder an ability of the ignition system to ignite the intake charge. Correspondingly, ignition systems may require periodic maintenance at predetermined service intervals (e.g., to replace worn spark plugs, to clean or replace fouled windows of a laser ignition system, and/or the like). Such maintenance may involve significant downtime, a decrease in productivity, and other setbacks. At higher power ratings (e.g., higher BMEP levels), such fouling and/or other adverse effects may be even more pronounced, thereby requiring shorter service intervals and even more downtime.

A laser ignition system 200 described herein addresses the setbacks described above. For instance, laser ignition system 200 includes a window 202 through which an optical source 206 (e.g., a laser source) emits a laser beam into a combustion chamber 118 or a pre-combustion chamber 218 to ignite an intake charge. Window 202 is provided with a catalyzed layer 204 that is configured to interface with combustion chamber 118 or pre-combustion chamber 218, and cause a reaction with (e.g., cause oxygen, nitrogen dioxide, and/or another compound to react with) soot at an activation temperature to reduce accumulation of soot on window 202. The activation temperature is configured such that catalyzed layer 204 is activated by typical operating temperatures (e.g., at least during the closed cycle portion) of engine 110. In some cases, normal operating conditions may not enable catalyzed layer 204 to remain activated for sufficient durations and soot may nonetheless accumulate and obstruct window 202. In such cases, a controller 116 of laser ignition system 200 may be used to initiate a corrective action which temporarily increases an operating temperature of engine 110 and enables catalyzed layer 204 to sufficiently clear the accumulation of soot. Controller 116 may perform the corrective action periodically (e.g., according to a pre-defined service interval) and/or in response to a decrease in combustion quality (e.g., as detected based on sensors 112 associated with engine 110).

Accordingly, laser ignition system 200 overcomes one or more problems associated with currently available ignition systems. For instance, by using lasers instead of spark plugs, laser ignition system 200 enables engine 110 to be operated at higher power ratings (e.g., higher BMEP levels) without a need for shorter service intervals. By providing window 202 with catalyzed layer 204 that reduces an opportunity for soot to accumulate on window 202 and hinder ignition, laser ignition system 200 is able to maintain engine 110 in optimal operating conditions for longer periods of time. Furthermore, by maintaining engine 110 in optimal operating conditions, laser ignition system 200 reduces misfires, increases power output, increases fuel economy, and decreases in unwanted emissions. In addition, by configuring controller 116 to initiate a corrective action that cleans soot from window 202 periodically and/or in response to suboptimal operating conditions, laser ignition system 200 overcomes a need to disassemble engine 110 and manually clean window 202. By enabling window 202 to remain clean and/or to be cleaned without disassembly of engine 110, laser ignition system 200 significantly reduces downtime and increases productivity of a machine 102 associated with engine 110.

What is claimed is:

1. A device comprising:
  a window having a first surface and a second surface;
  a catalyzed layer disposed on the first surface of the window,
    the catalyzed layer including a compound having a threshold transmittance of at least 90%, and being configured to cause an oxidation reaction with soot at an activation temperature to reduce accumulation of the soot on the window,
    the catalyzed layer comprising cerium oxide,
    the catalyzed layer having a thickness ranging between 1 nm and 2.5 nm; and
  a laser source aimed at the second surface of the window, and being configured to emit a laser beam through the window and the catalyzed layer,
    the laser beam being configured to cause ignition of an intake charge in a combustion chamber of a combustion engine, a pre-combustion chamber of the combustion engine, or both the combustion chamber and the pre-combustion chamber.

2. The device of claim 1, wherein the window comprises one or more of silica, quartz, or sapphire.

3. The device of claim 1, wherein the catalyzed layer comprises a catalyst configured to oxidize the soot at the activation temperature, the activation temperature lying within a range from 400° C. to 800° C.

4. The device of claim 1, wherein the catalyzed layer includes one or more of a convex surface or a concave surface configured to adjust a focal point of the laser beam.

5. The device of claim 1, further comprising one or more lenses disposed between the laser source and the second surface of the window,
  the one or more lenses being configured to focus the laser beam emitted by the laser source to one or more focal points within the combustion chamber.

6. A system, comprising:
  a combustion engine having a combustion chamber configured to receive an intake charge, the combustion chamber being defined between a cylinder head, a piston, and a cylinder bore of the combustion engine;

a window disposed in optical communication with the combustion chamber;

a catalyzed layer disposed on a first surface of the window and in fluid communication with the combustion chamber, the catalyzed layer being configured to cause an oxidation reaction with soot at an activation temperature to reduce accumulation of the soot on the window;

an optical source aimed at a second surface the window and configured to emit a beam of light into the combustion chamber through the window and the catalyzed layer; and a controller in electrical communication with the combustion engine and the optical source, the controller being configured to selectively activate the optical source to ignite the intake charge, receive, from a sensor of the combustion engine, sensor data relating to a combustion quality associated with the combustion chamber, identify a decrease in the combustion quality based on the sensor data, and cause an action to be performed in response to the decrease in the combustion quality, the action including increasing a temperature of the catalyzed layer to the activation temperature for a first threshold duration of time.

7. The system of claim 6, wherein the combustion engine further comprises a pre-combustion chamber that is in fluid communication with the combustion chamber and defined within the cylinder head of the combustion engine, the window being disposed within the cylinder head, and
the catalyzed layer being disposed in fluid communication with the pre-combustion chamber.

8. The system of claim 6, wherein the combustion engine further comprises one or more sensors, each sensor of the one or more sensors being disposed relative to one or more of the cylinder head, the combustion chamber, the cylinder bore, or a crankshaft of the combustion engine, and each sensor of the one or more sensors being configured to measure one or more of a temperature of the combustion chamber, an angular acceleration of the crankshaft, or a combustion quality associated with the combustion chamber.

9. The system of claim 6, wherein the catalyzed layer comprises cerium oxide, the catalyzed layer having a thickness ranging between 1 nm and 2.5 nm and a threshold transmittance of at least 90%.

10. The system of claim 6, wherein the catalyzed layer comprises a catalyst configured to oxidize the soot at the activation temperature, the activation temperature lying in a range from 400° C. to 800° C.

11. The system of claim 6, wherein the controller is further configured to:

determine an operating time duration of the combustion engine, compare the operating time duration to a threshold duration of time, and increase a temperature of the catalyzed layer to the activation temperature for a second threshold duration of time in response to determining that the operating time duration meets the threshold duration of time.

12. The system of claim 6, further comprising one or more lenses disposed between the optical source and the window, the one or more lenses being configured to focus the beam of light emitted by the optical source to one or more focal points within the combustion chamber.

13. The system of claim 6, further comprising one or more seals disposed between the window and one or more of the cylinder head, the cylinder bore, or a surface of a pre-combustion chamber of the combustion engine, the one or more seals comprising an insulating material configured to reduce heat transfer between the window and one or more of the cylinder head, the cylinder bore, or the surface of the pre-combustion chamber.

14. A method, comprising:

transmitting, to an optical source, a command signal to emit a beam of light to ignite an intake charge of a combustion engine;

determining an operating condition associated with the combustion engine;

determining a combustion quality index of the combustion engine based on the operating condition, the combustion quality index being indicative of possible accumulation of soot on a window of the optical source;

comparing the combustion quality index to a threshold index value; and causing an action to be performed based on the comparison of the combustion quality index to the threshold index value, wherein the action includes increasing a temperature of a catalyzed layer disposed on a surface of the window to an activation temperature for a threshold duration of time, the catalyzed layer being configured to oxidize the soot at the activation temperature.

15. The method of claim 14, wherein the optical source is a laser source configured to emit a laser beam through the window and into a combustion chamber of the combustion engine, the laser beam being configured to cause ignition of the intake charge.

16. The method of claim 14, wherein determining the operating condition comprises:

determining the operating condition based on sensor data provided by one or more sensors disposed relative to one or more of a cylinder head of the combustion engine, a combustion chamber of the combustion engine, a cylinder bore of the combustion engine, or a crankshaft of the combustion engine, the sensor data including information relating to one or more of an operating time of the combustion engine, a temperature associated with the combustion chamber, or an angular acceleration of the crankshaft.

17. The method of claim 14, wherein determining the combustion quality index comprises:

determining the combustion quality index based on one or more of an operating time of the combustion engine, a temperature associated with a combustion chamber of the combustion engine, or an angular acceleration of a crankshaft of the combustion engine.

* * * * *